March 24, 1964 T. PERSSON 3,125,934
DEBURRING AND CHAMFERING MACHINE
Filed Dec. 6, 1960 2 Sheets-Sheet 1
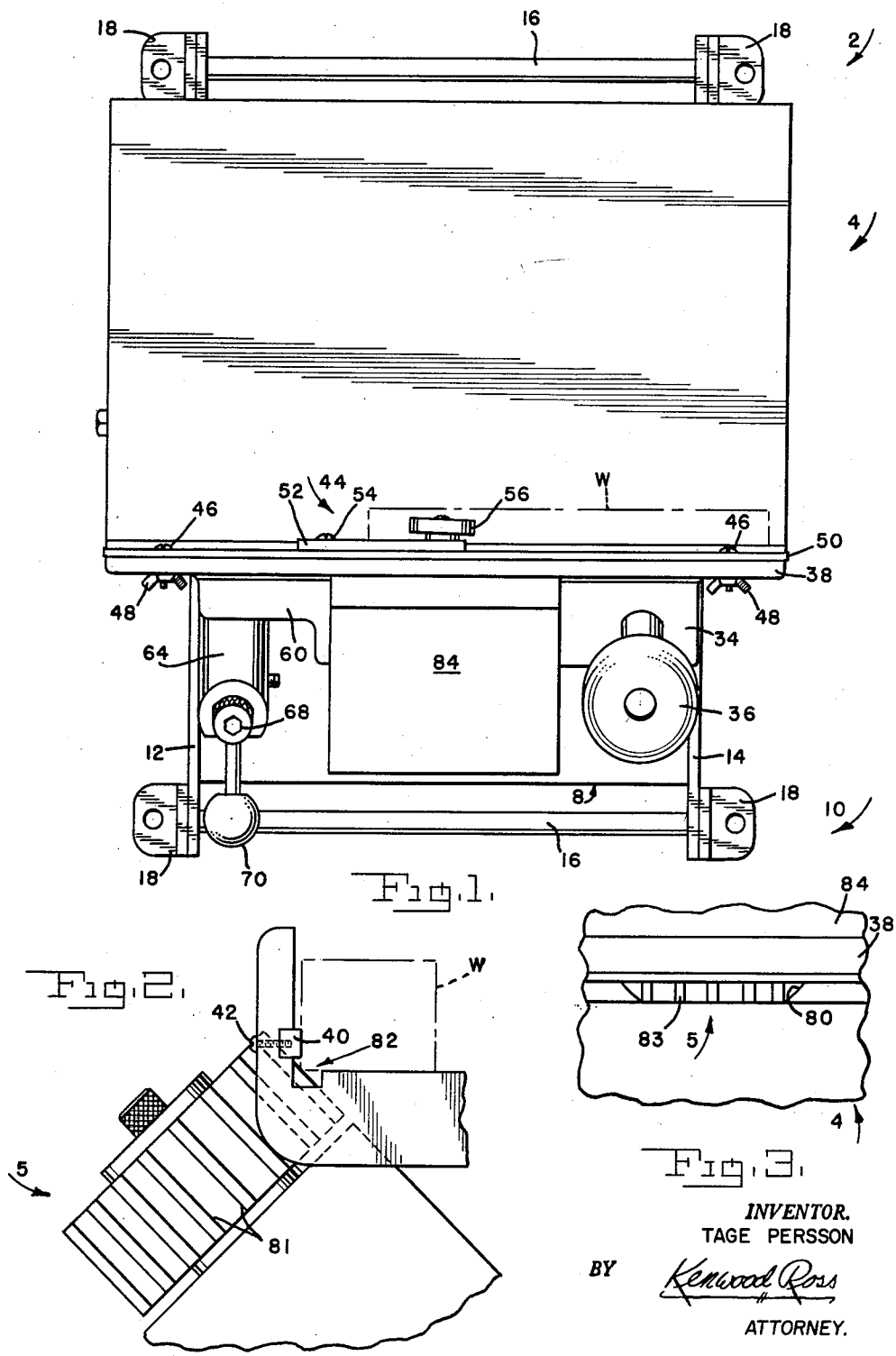
INVENTOR.
TAGE PERSSON
BY *Kenwood Ross*
ATTORNEY.

March 24, 1964 T. PERSSON 3,125,934
DEBURRING AND CHAMFERING MACHINE
Filed Dec. 6, 1960 2 Sheets-Sheet 2
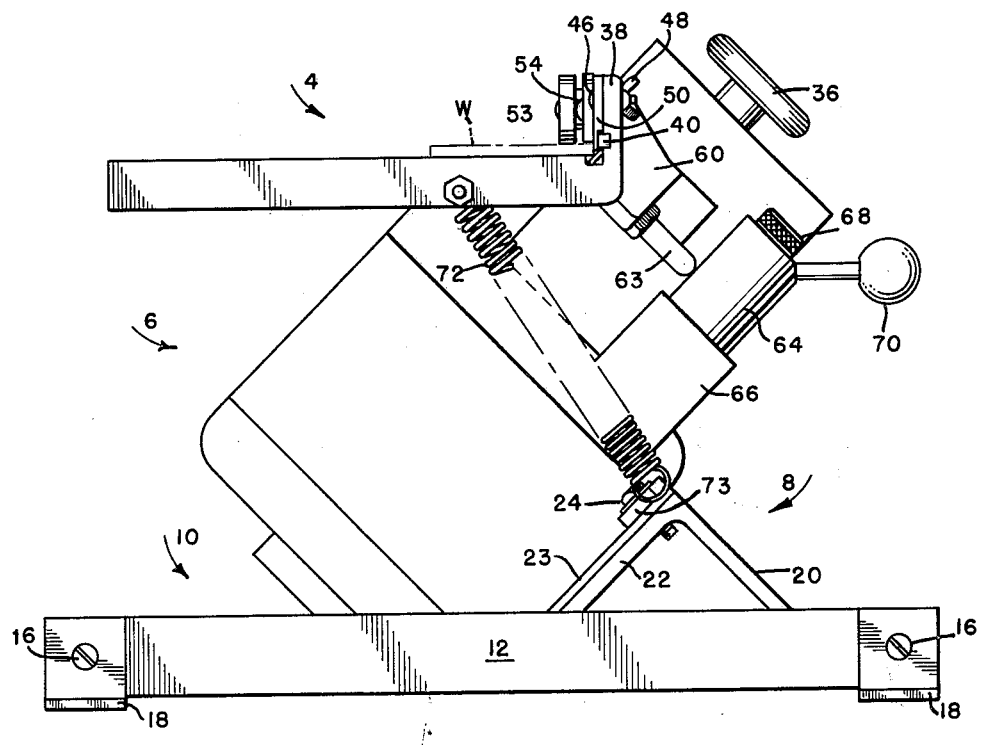
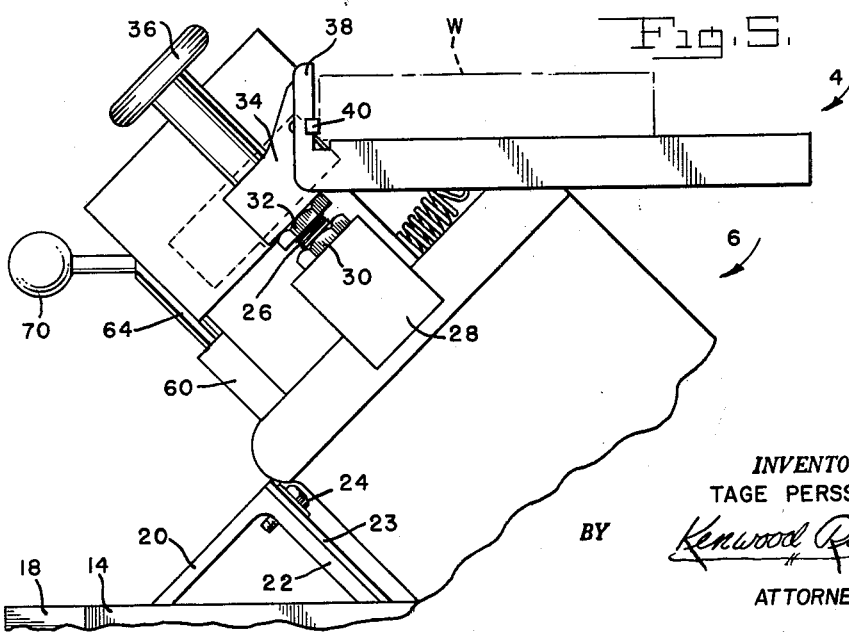
INVENTOR.
TAGE PERSSON
BY Kenwood Ross
ATTORNEY.

United States Patent Office 3,125,934
Patented Mar. 24, 1964

3,125,934
DEBURRING AND CHAMFERING MACHINE
Tage Persson, 224 Glenwood Ave., Bloomfield, N.J.
Filed Dec. 6, 1960, Ser. No. 74,039
5 Claims. (Cl. 90—18)

The present invention relates generally to new and useful improvements and structural refinements in a deburring and chamfering machine and is directed more particularly to the provision of a new concept in a means for cutting edges or corners.

It will be helpful to an understanding of the invention to first briefly consider some of the essential points and more important features and aspects thereof, so that same may be kept in mind during subsequent reading of the detailed description of the practical embodiment of the improvements and illustration thereof in the hereunto annexed drawings.

Accordingly, it is first to be noted that my invention contemplates a milling apparatus and means for cutting the tough or sharp edges or corners of workpieces.

Without intending to place undue limitations upon the scope of the invention beyond what may be required by the state of the prior art, the particular embodiment may be briefly described as embracing the concept of a machine or instrumentality for cutting or deburring and finishing the sharp edges or corners of workpieces, which may be operated by even the most inexperienced operator quickly, simply, and efficiently and by means of which corners and/or edges may be cut faster, cleaner, more uniformly and more economically.

The invention comprehends a particular construction, arrangement, combination, and relationship of various components and instrumentalities as exemplified in the following detailed disclosure wherein the objects hereof, as defined in the paragraphs below, will be apparent.

One chief object of the present invention is to provide a means which is operable on all kinds of hard or soft materials. In the accomplishment of this object, I provide a means whereby, when one cutting portion of the cutter employed herewith is rendered dull through use, ready adjustment may be made to a new position therealong, without the use of tools or other accessory equipment.

I envision the use of the full width of the circumferential cutting face of the cutter wherefor the full life thereof is appreciably lengthened. In prior art devices, the center of the cutter normally sustains the greatest wear and accordingly dulls first inasmuch as the greatest mass of material is located thereat. Herewith, even though the cutter will eventually dull, to be sure, it will not draw up the second burr because where the burr counts is at the very edge of the cut. If such is clean, then favorable results are attained. If the cutter is dull in the center, it still cannot leave a burr because the cutter removes hardly any material where it counts.

Another feature hereof resides in the fact that the apparatus may be readily adjusted for providing small and large chamfers.

Another salient feature of the present invention lies in the fact that I provide a rotary cutting device having an effective working surface on its outer annular face which is accessible for cutting the edge or corner of a workpiece without interference from other parts of said cutting device and its associated power means.

It is another object of the invention to provide a machine wherein the operator may bring the workpiece to the machine and may accomplish the cutting action on a certain edge or corner of the workpiece by means of a single pass of the workpiece past the cutting tool.

It is still another object of the invention to provide a guide means against which the workpiece may be supported while the edge or corner cutting operation is being performed thereon.

The invention generally envisions a frame having a substantially horizontally-disposed planar work-supporting surface or table carried thereby, said frame enclosing therewithin a power means having a drive shaft angularly disposed relative to the work-supporting surface and carrying in rotative movement therewith an annular cutter which is also disposed in an angular plane relative to said work-supporting surface.

To make the manufacture of a deburring and chamfering machine a more profitable undertaking, the mechanism embodying the essence of the invention has been engineered in manner as to be simple in its construction so as to expedite economical large-scale production and assembly, the usual complexity of components having been so greatly reduced as to offer a compact design representative of a fundamentally new concept in the combining and coacting of deburring and chamfering machine parts.

Precision of relative dimensioning of parts as militates against inexpensive manufacture, and simplicity of maintenance and care, have been assiduously borne in mind in the development hereof.

Too, I provide a cutting apparatus of the above-mentioned character in which ruggedness and durability of construction are combined with simplicity of protection against usual but hard conditions of practical use.

Further, while the components are uniquely compact, they are nevertheless readily accessible for maintenance and replacement purposes, with a consequent reduction in maintenance costs over related devices heretofore known.

To provide apparatus which effectively meets the requirements therefor and performs its functions in a practical and dependable manner are among the dominant aims of this invention although it may be noted that certain features herein set forth are utilized to advantage in other relations.

The machine is particularly adapted for cutting edges or corners smoothly, easily and precisely and permits of long continued use with a minimum of need for repair or maintenance on the part of the user, resulting in important distinct advantages in economy of manufacture, ease of operation, reliability of performance, and capability of ready assembly to provide positiveness and ease of manual as well as mechanical control and action under the varying conditions of practical use.

The foregoing objects and other incidental ends and advantages will in part be obvious and apparent and will in part be more fully pointed out as the nature of the invention is better understood in the progress of the disclosure below. To the end of attaining these and any other objects and advantages hereinafter reasonably appearing, it will be explained that the invention consists substantially in the combination, construction, location and relative arrangement of parts, as shown herein.

Such is only indicative of but one of the various ways, in which the principles of the invention may be employed and in which the component parts may be combined and arranged. The invention is not restricted or confined to said embodiment and same is not intended to be exhaustive of, nor limiting of, the spirit or scope hereof. That is, the precise construction of the figures of the drawings need not be slavishly followed as, of course, the deburring and chamfering machine may have to be adapted or modified in accordance with any specific use contemplated therefor. Such adaptations and/or alternative constructions and/or modifications should be and are intended to be comprehended within the meaning and purview and range of equivalence of the below subjoined claims, there being no intent to have this invention limited to or circumscribed by any specific details.

The characteristic features which I consider to be novel with my invention, as to its construction and organization and as to its method of operation, will be better understood from a consideration of the following description, when read in conjunction with the illustration in the accompanying drawings in which:

FIG. 1 is a top plan view of apparatus embodying the invention;

FIG. 2 is an enlarged, fragmentary, end elevational view showing the relationship of the work piece, work table and cutting tool;

FIG. 3 is an enlarged, fragmentary, top plan view of that portion of the work table overlying the cutting tool;

FIG. 4 is a side elevational view taken from the left of the apparatus, as viewed in FIG. 1; and FIG. 5 is an enlarged side elevational view taken from the right, as viewed in FIG. 1.

In the following description and in the appended claims, various components and details thereof will be identified by specific names for purposes of convenience. The phraseology or terminology herein employed is for the purpose of description and not of limitation.

With continued reference now to the drawings, which illustrate a typical and preferred embodiment of the invention for the purpose of disclosure, I have shown a deburring or chamfering machine generally indicated by 2 and comprising generally a large planar work table or work supporting surface or platform generally indicated by 4 disposed above a cutter generally indicated by 5 and a motor 6 of special design which is carried by and supported angularly relative to a motor bracket 8 fixed to a base generally indicated by 10.

Base 10 is comprised of spaced, parallel side rails 12 and 14 joined at their opposite ends by transverse cross braces 16 and provided with outwardly extending mounting brackets or feet 18 at their extremities whereby the base may be mounted to a suitable supporting surface such as a work bench.

Alternatively, base 10 may be mounted upon a pedestal or stand.

Motor bracket 8 is fixed to side rails 12 and 14, as by weldments or the like, and may include angularly-disposed downwardly-depending front and rear legs or walls 20 and 22 respectively.

Motor 6 is fixed to motor bracket 8 as by bolts 24 extendable through the usual lugs or mounts 23 provided on said motor and threadedly engaged in suitable aligned openings provided in said rear leg 22.

Table 4 is pivotally mounted relative to motor 6 upon an elongated adjusting stud 26 extending outwardly from a lug 28 projecting outwardly from motor 6.

Said adjusting stud 26 is secured to said lug 28 by means of a locking nut 30.

Adjusting stud 26 is journalled in a lug 34 projecting angularly downwardly from the forward edge of table 4 and has a handle 36 threadedly engaged thereon on the side of said lug 34 opposite from said lug 28.

The desired positioning of table 4 relative to base 10 and more particularly other components subsequently to be described may be effectuated by the rotating of an adjustment nut 32 threadedly engaged upon said adjusting stud 26 between said lug 34 and lug 28.

Table 4 is disposed in a generally horizontal plane, as aforesaid, is generally square or rectangular in configuration and is provided along the entirety of one side edge thereof with an upstanding wall 38 extending vertically upwardly therefrom and integral therewith.

As will be observed, said wall 38 functions as a guiding wall when a work piece W is placed upon the table surface and is moved in operative position relative to the cutting element, shortly to be described.

An insert or gate 40 comprising an elongated strip of hardened metal is receivable in a suitable recess provided along the length of the inner surface of wall 38 and may be secured to said wall as by screws 42 or the like.

The recess and the insert or gate 40 are so dimensioned that a portion of the insert or gate projects outwardly and forwardly of the vertical plane of the inner surface of the wall 38.

Further, the recess is disposed in a horizontal plane upwardly of the horizontal plane of the upper planar surface of the table sufficiently to ensure that the insert or gate is not cornered in the juncture of table 4 and wall 38.

Wall 38, being normally formed of a soft cast iron, is protected, by means of insert 40, from injury or damage resulting from any sharp or jagged edges found on work pieces introduced to the apparatus, such edges frequently having a capacity for cutting into the softer iron parts. Such injuries are not only damaging to the apparatus components but often prevent the easy flow of work pieces along and relative to the table surface, as the ragged edges lead to resistance so that the movement of the work pieces, if not precluded altogether, is at least jerky and less than smooth.

The projection outwardly of insert 40 from wall 38 and above table 4 permits the accumulation of ragged edges of the work pieces therebelow, if necessary.

The apparatus may be provided with an attachment for use when and as relatively thin and/or bendable material such as sheet metal is desired for employment therewith.

Such attachment is generally indicated by the numeral 44 and comprises an elongated base member 50 which may be secured to the inner surface of wall 38 as by bolts 46 or the like having nuts 48 threadedly engaged therewith to serve the usual clamping function and a carrier 52 pivotally mounted on the outer face of said base member 50 as by a pivot screw 54 extendable through said carrier at one extremity thereof, said screw 54 serving to be tightened so as to hold the carrier at any desired position relative to the base member 50 of the attachment.

Carrier 52 rotatably carries at one extremity thereof opposite from the pivot screw 54 a wheel 56 upon its forward face and is so positioned relative thereto that its vertical plane is slightly angular relative to the vertical plane of the carrier 52, said angle being approximately 15°.

Said wheel 56 is preferentially formed of rubber so as not to mark the material being operated upon and so as to be sufficiently resilient as to offer the desired pressure to be reverted to.

The wheel is so disposed relative to the carrier and the carrier is so disposed relative to the vertical wall 38 and the upper planar surface of the table 4 that the distance between the lowermost portion of the outer periphery of the wheel and the plane of the table may be adjusted to accommodate any thickness of metal stock being employed therewith by the loosening of the pivot screw, the raising or lowering of the carrier by a pivoting movement upon said pivot screw, and by the tightening of the pivot screw at the adjusted position.

Wheel 56 being disposed at a fixed angle relative to the carrier, as aforesaid, it serves to press a workpiece sidewise toward the base member 50 as well as downwardly toward the table surface and the cutting element in operational use, thus insuring that sufficient pressure will be exerted against the cutter.

It will be appreciated that in the case of a heavy work piece, same may be placed flat upon the table and pushed past the cutter.

Contrariwise, sheet metal stock, aforementioned, may be so thin that it would necessitate the placement of the operator's hand or finger opposite to the cutter at all times in order to cut same. Accordingly the wheel presses the material downwardly against the cutter and simultaneously, it being disposed in a plane at an angle substantially at 15° to the plane of the carrier 52, so that as the material is pushed inwardly it is successfully retained against the gate 40.

The angle of the rubber wheel is such as to retain the workpiece against the gate as well as to keep it downwardly against the table.

A lug 60 projecting from the table 4 and spaced at the opposite end of the table from lug 34 extends angularly downwardly from the table and has a pin or stud 63 extending angularly downwardly therefrom. Stud 63 rides on the surface of a cam or eccentric 64 extending angularly upwardly from a cam mounting 66 fixed to motor 6. Cam 64 is journalled on a socket bolt 68 extending downwardly to cam mounting 66 and is rotatable relative to said bolt as by a handle 70. As the cam is rotated, pin or stud 63 rides thereon so as to effectuate the raising or lowering of the table.

A tension spring 72 extends between, and is fixed to, table 4 and a finger 73 extending outwardly from motor bracket 8 to insure stability of the free end of the table, and to allow the angularization of the table relative to the cutting wheel.

Table 4 may be angularized by rotation of handle 70, thereby causing stud 63 to ride on cam or eccentric 64 and causing the table to pivot on stud 26 extending outwardly from mount 28 located adjacent the opposite side of the table. Such makes it possible to adjust from a smaller to a larger cut.

An opening or slot 80 is provided centrally of the forward end of table 4 and of wall 38 through which a portion of the cutter 5, operatively connected to a driving shaft (not shown) of motor 6, extends. As aforesaid, the motor is inclined relative to the table, as is the cutter operatively connected thereto.

Cutter 5 may be of any of the generally known types having a plurality of ground cutting edges 81 circumferentially disposed about its outer periphery.

The cutter has a working surface 82 on its side facing away from the axis of rotation of the wheel.

The working surface of the cutter is inclined relative to the horizontal plane of the table at approximately forty-five degrees as the shaft upon which the cutter is mounted is inclined within the motor at the same angle to the vertical.

A protective casing or shield 84 may enclose cutter 5 and be fixed to and extend forwardly of the table intermediate lugs 28 and 66.

Table 4 is adapted to receive thereon, in a supporting manner, a workpiece W and to allow a sliding movement of same relative thereto from one side thereof to the other along and adjacent gate 40.

As the workpiece moves across slot 80, a corner or edge of workpiece W contacts working surface 82 of the cutter 5 for the accomplishment of the deburring or chamfering action thereon during operational use so as to provide a chamfered corner or edge.

The milling operation is performed by a portion of the flat, outer angularly-disposed peripheral face 82 of cutter 5 as the workpiece is seated on table 4 and is manually or mechanically moved from one end thereof to the other and past opening or slot 80.

Only that portion of cutter 5 which projects into opening 80 contacts the workpiece, thereby materially reducing cutter wear.

The adjustment for cutter wear is easily provided for by the movement of table 4 relative to the motor and cutter simply by the rotation of hand wheel 36 and nut 32, according to the adjustment desired to be made.

The cam 64, it will be understood, is for height control purposes. Starting from zero where you have no cutting action whatever, as you come down on the cam, the table is lowered. In this manner, it is possible to traverse the cutting width of the cutter and thereby take full advantage of its entire width.

As that portion of the cutting wheel which extends through slot 80 becomes worn or dull, table 4 may be raised or lowered so as to take advantage of a different portion of the circumference of the cutting wheel. Preferentially, to obtain fullest use thereof, the operator will start at one side thereof and work across.

Assume that the table is initially set so that the lowest portion of the outer circumference of the cutting wheel is projecting through slot 80. As this portion of the wheel becomes worn or dull, it will be desirable to expose another unworn portion of the cutter at the slot.

This will be accomplished by loosening handle 36, raising the table relative to stud 26 and bringing adjustment nut 32 ito contact with lug 34 depending downwardly from the forward end of the table. This procedure may be followed each time it is desired to expose a different portion of the outer circumference of the cutter. Each adjustment may be very minute whereby the entire outer periphery of the wheel is eventually utilized.

It will be understood that stud 26 not only serves as a base for use in the adjustment of table height relative to the cutting wheel, but also acts as the pivot point when the table is angularized by movement of the eccentric 64 relative to stud 63.

From the foregoing, it is obvious that I have provided a novel deburring and chamfering device which is versatile in performance and capable of adjustment whereby not only depth of cut is controlled, but table height relative to the cutting wheel may also be controlled.

It is believed that the gist of the invention will be clearly understood from the foregoing disclosure and accordingly, further analysis thereof at this point is considered unnecessary, as I have, in accordance with the provisions of the patent statutes, described the construction and principle of operation of my invention together with the apparatus which I believe to represent the best embodiment thereof, to the end that others can, by applying current knowledge, readily adapt it for various applications without omitting features which, from the standpoint of prior art, fairly constitute essential characteristics of its generic and/or specific aspects. The substitution of equivalents and other changes, modifications and alterations as circumstances may suggest or render expedient, are reasonably contemplated, the invention being susceptible of such without departing from its real spirit or underlying principles.

The claims are desired to include within the scope thereof all of said suitable variations, modifications and equivalents by which the results of the invention may be obtained through the use of substantially the same or equivalent devices or means. Accordingly, limitation hereof should only be made as determined by a proper interpretation of the prior art and the scope of the subjoined claims, in which it is my intention to claim all novelty inherent herein as broadly as possible.

I therefore particularly point out and distinctly claim as my invention:

1. A deburring and chamfering device comprising, a housing including a planar work supporting surface having an upstanding wall along the entirety of one side edge thereof, an opening centrally of said one side edge of said work supporting surface and of said upstanding wall, a shaft supported adjacent the work supporting surface of said housing and at an angle to a perpendicular thereto, a power means supported by said housing for rotating said shaft, a cutting wheel mounted on the upper end of said shaft at substantially 90 degrees to said shaft, said cutting wheel having cutting face surface circumferential and concentric to the axis of rotation of said wheel with the cutting face surface facing away from said shaft, said cutting face surface being angularly disposed relative to said work supporting surface with a portion of said cutting face surface extending through the opening in said work supporting surface and said upright wall, rotatable cam means integral with said power means and disposed on a first side thereof for effectuating the angularization of said work supporting surface, and additional adjustment means integral with said power means and disposed on a second side thereof for effectuating the repositioning of said work supporting surface relative to said cutting wheel and comprising a stud extending from said power means to said work supporting surface, said stud having handle means threaded thereon and engageable with said work supporting surface.

2. In a corner cutter, a cutting tool mounted for rotation about a predetermined angular path, a planar support having a guide adjacent one side edge thereof and adjacent said path to support a workpiece in a direction intersecting said path, said support and said guide having an opening to permit said cutting tool to intersect the path of movement of the workpiece, power means to rotate said cutting tool, said power means having cam means integral therewith for effectuating the angularization of said planar support relative to said cutting tool, and having adjustment means integral therewith for effectuating relative vertical movement of said planar support relative to said cutting tool.

3. In a corner cutter as set forth in claim 2 wherein said adjustment means integral with said power means for effectuating relative vertical movement of said planar support relative to said cutting tool comprises a stud extending from said power means to said planar support, said stud having handle means threaded thereon and engageable with said planar support.

4. In a corner cutter as set forth in claim 2 including an insert in said guide for precluding contact of the workpiece with said guide.

5. In a corner cutter as set forth in claim 2 including a carrier fixed to said guide means having a wheel rotatably mounted thereon and disposed angularly relative thereto, said wheel serving to press said workpiece downwardly toward said planar support.

References Cited in the file of this patent
UNITED STATES PATENTS

| | | |
|---|---|---|
| 201,822 | Myers | Mar. 26, 1878 |
| 309,093 | Pratt et al. | Dec. 9, 1884 |
| 1,669,941 | Kennedy | May 15, 1928 |
| 1,829,393 | Carter | Oct. 27, 1931 |
| 2,253,354 | Svensson | Aug. 19, 1941 |
| 2,612,914 | Reynolds | Oct. 7, 1952 |
| 2,722,247 | Schroeder et al. | Nov. 1, 1955 |

FOREIGN PATENTS

| | | |
|---|---|---|
| 65,553 | Denmark | Aug. 11, 1947 |